(12) United States Patent  (10) Patent No.: US 8,789,433 B2
Jerwick et al.  (45) Date of Patent: Jul. 29, 2014

(54) HEAVY DUTY TRUCK TRANSMISSION WITH TRIPLE OVERDRIVE

(75) Inventors: John Jerwick, Hagerstown, MD (US); Michael E. Kahl, Hagerstown, MD (US)

(73) Assignee: Mack Trucks, Inc., Greensboro, NC (US)

( * ) Notice: Subject to any disclaimer, the term of this patent is extended or adjusted under 35 U.S.C. 154(b) by 0 days.

(21) Appl. No.: 13/819,332

(22) PCT Filed: Oct. 18, 2010

(86) PCT No.: PCT/US2010/053011
§ 371 (c)(1),
(2), (4) Date: Feb. 26, 2013

(87) PCT Pub. No.: WO2012/054015
PCT Pub. Date: Apr. 26, 2012

(65) Prior Publication Data
US 2013/0192397 A1  Aug. 1, 2013

(51) Int. Cl.
*F16H 3/08* (2006.01)
*F16H 3/091* (2006.01)
*F16H 37/04* (2006.01)
*F16H 61/70* (2006.01)

(52) U.S. Cl.
CPC ........ *F16H 3/091* (2013.01); *F16H 2200/0078* (2013.01); *F16H 2037/045* (2013.01); *F16H 37/043* (2013.01); *F16H 2200/0095* (2013.01); *F16H 61/70* (2013.01)
USPC .............................................. 74/329; 74/331

(58) Field of Classification Search
CPC ......... F16H 3/095; F16H 3/006; F16H 3/097; F16H 3/0915; F16H 2057/02043; F16H 2057/02056; F16H 63/44

USPC ................... 74/325, 329, 331, 333, 359, 745
See application file for complete search history.

(56) References Cited

U.S. PATENT DOCUMENTS

| 2,637,221 A | 5/1953 | Backus et al. |
| 2,637,222 A | 5/1953 | Fackus |
| 2,667,955 A | 2/1954 | Bixby |
| 3,105,395 A | 10/1963 | Perkins |
| 3,283,613 A | 11/1966 | Perkins |
| 3,335,616 A | 8/1967 | Perkins |

(Continued)

OTHER PUBLICATIONS http://www.thetruckersreport.com/truckingindustryforum/trucks-eighteen-wheelers/15366-old-gears-transmission-info-of-yester-year.html.

(Continued)

*Primary Examiner* — Troy Chambers
*Assistant Examiner* — Jude Agendia
(74) *Attorney, Agent, or Firm* — WRB-IP LLP

(57) ABSTRACT

A transmission capable of triple overdrive includes a main box section connected to a first input shaft. The main box section comprises clutch collars which are connected to the main shaft and axially movable by an operator to selectively couple one main shaft gear to a main shaft via a countershaft gear fixed on a countershaft. An auxiliary section is connected to the main box section and contains a splitter section and a range section. An output shaft is connected to the auxiliary section The transmission is selectively configured Io operate in a plurality of gear combinations. At least three of the gear combinations are configured for overdrive. The main box section is connected directly to the splitter section.

16 Claims, 15 Drawing Sheets

(56) References Cited

U.S. PATENT DOCUMENTS

| | | | |
|---|---|---|---|
| 3,648,546 A | 3/1972 | McNamara et al. | |
| 3,799,002 A | 3/1974 | Richards | |
| 3,802,293 A | 4/1974 | Winckler et al. | |
| 3,921,469 A | 11/1975 | Richards | |
| 3,924,484 A | 12/1975 | Richards | |
| 4,440,037 A | 4/1984 | Foxton et al. | |
| 4,633,987 A | 1/1987 | Rogner et al. | |
| 4,703,667 A | 11/1987 | Richards | |
| 4,754,665 A * | 7/1988 | Vandervoort | 74/745 |
| 4,876,924 A * | 10/1989 | Fletcher et al. | 74/745 |
| 4,901,600 A * | 2/1990 | Wilson | 74/745 |
| 4,964,313 A * | 10/1990 | Davis | 74/331 |
| 4,966,048 A * | 10/1990 | Braun | 74/745 |
| 5,199,314 A | 4/1993 | Hutchison | |
| 5,647,249 A * | 7/1997 | Okada et al. | 74/606 R |
| 5,679,096 A * | 10/1997 | Stine et al. | 477/111 |
| 5,899,121 A * | 5/1999 | Mulvihill et al. | 74/745 |
| 5,907,974 A | 6/1999 | Stine | |
| 5,974,906 A | 11/1999 | Stine et al. | |
| 6,012,345 A | 1/2000 | Wafzig et al. | |
| 6,085,606 A * | 7/2000 | Stine et al. | 74/331 |
| 6,128,974 A * | 10/2000 | Hughes | 74/745 |
| 6,428,447 B2 | 8/2002 | Onuki | |
| 6,463,823 B2 * | 10/2002 | Walker | 74/335 |
| 6,524,221 B2 | 2/2003 | Nishimura | |
| 7,013,756 B2 | 3/2006 | Ball | |
| 7,691,024 B2 | 4/2010 | Phillips et al. | |
| 7,866,232 B2 * | 1/2011 | Gitt et al. | 74/745 |
| 7,905,812 B2 * | 3/2011 | Romine | 477/92 |
| 2008/0047380 A1 | 2/2008 | Abramov | |
| 2009/0017966 A1 | 1/2009 | Phillips et al. | |
| 2009/0095101 A1 | 4/2009 | Gitt | |

OTHER PUBLICATIONS

International Search Report (Dec. 14, 2010) for corresponding International Application PCT/US2010/053011.

International Preliminary Report on Patentability (Oct. 15, 2012) for corresponding International Application PCT/US2010/053011.

* cited by examiner

| GEAR | # TEETH |
|---|---|
| 20 | 33 |
| 22 | 27 |
| 24 | 39 |
| 26 | 45 |
| 28 | 48 |
| 30 | 42 |
| 32 | 33 |
| 34 | 30 |
| 36 | 54 |
| 40 | 47 |
| 42 | 54 |
| 44 | 40 |
| 46 | 33 |
| 48 | 23 |
| 50 | 17 |
| 51 | 24 |
| 52 | 45 |
| 54 | 49 |
| 56 | 23 |

FIG. 4A

| GEAR NAME | GEAR SET ENGAGED | RATIO | FIGURE |
|---|---|---|---|
| LO LO | 20-40-48-28-34-54-56-36 | 11.40 | FIG. 3B |
| LO | 20-40-48-28-32-52-56-36 | 9.52 | FIG. 3C |
| 1 HI | 20-40-46-26-34-54-56-36 | 7.45 | FIG. 3D |
| 1 LO | 20-40-46-26-32-52-56-36 | 6.22 | FIG. 3E |
| 2 HI | 20-40-44-24-34-54-56-36 | 5.33 | FIG. 3F |
| 2 LO | 20-40-44-24-32-52-56-36 | 4.45 | FIG. 3G |
| 3 HI | 20-34-54-56-36 | 3.83 | FIG. 3H |
| 3 LO | 20-32-52-56-36 | 3.2 | FIG. 3I |
| 4 HI | 20-40-42-22-34-54-56-36 | 2.73 | FIG. 3J |
| 4 LO | 20-40-42-22-32-52-56-36 | 2.28 | FIG. 3K |
| 5 HI | 20-40-46-26-34 | 1.94 | FIG. 3L |
| 5 LO | 20-40-46-26-32-52-54-34 | 1.62 | FIG. 3M |
| 6 HI | 20-40-44-24-34 | 1.39 | FIG. 3N |
| 6 LO | 20-40-44-24-32-52-54-34 | 1.16 | FIG. 3O |
| 7 HI | 20-34 | 1.00 | FIG. 3P |
| 7 LO | 20-32-52-54-34 | 0.83 | FIG. 3Q |
| 8 HI | 20-40-42-22-34 | 0.71 | FIG. 3R |
| 8 LO | 20-40-42-22-32-52-54-34 | 0.59 | FIG. 3S |
| REV 1 | 20-40-50-51-30-34-54-56-36 | 13.49 | FIG. 3T |
| REV 3 | 20-40-50-51-30-32-52-56-36 | 11.27 | FIG. 3U |
| REV 2 | 20-40-50-51-30-34 | 3.52 | FIG. 3V |
| REV 4 | 20-40-50-51-30-32-52-54-34 | 2.94 | FIG. 3W |

FIG. 4B

HEAVY DUTY TRUCK TRANSMISSION WITH TRIPLE OVERDRIVE

BACKGROUND AND SUMMARY

The present invention relates generally to a truck transmission and, more particularly, to a transmission having at least three overdrive configurations.

Heavy duty class 8 manual truck transmissions are geared to match the engine speed with the axle carrier ratio and wheel size. Typically the top transmission gear ratio is matched in the vehicle to give a specific narrow band engine speed at top vehicle speed. Under heavy weighted vehicle applications, the ratio between steps may be too great causing the engine speed to fall out of the narrow fuel efficient engine band. The industry standard for heavy duty truck manual transmissions is to create a split ratio in between ratios to maintain ideal engine speed. Historically, this split has created an overdrive feature.

Overdrive refers to a combination of gearing inside a transmission which results in the output speed being greater than the input speed. Overdrive allows the engine to operate at a lower revolutions per minute (RPMs) for a given road speed. This allows the vehicle to achieve better fuel efficiency and often quieter operation on the highway.

Heavy duty truck transmissions are presently often made with eighteen speeds. These are achieved using a standard nine speed transmission and adding a splitter to the rear of the transmission, thereby doubling the amount of speeds. Normally this splitter is geared as an under drive ratio, limiting the number of overdrive ratios available in the transmission.

More than two overdrive ratios may also be created by using multiple overdrive gears, as discussed in "The Trucker's Report" (http://www.thetruckersreport.com/truckingindustryforum/trucks-eighteen-wheelers/15366-old-gears-transmission-info-of-yesteryear.html).

Eaton Corp. Transmission Model RTOO-1463 has a main gear box and splitter that each have a gear configured with an overdrive ratio which permits three total overdrive ratios. These three ratio configurations include the main gear box in direct drive and the splitter in overdrive, the splitter in direct drive and the main gear box in overdrive, and both the splitter and the main gear box in overdrive. The RTOO-14613 contains a splitter section that is located between the range section and the output shaft. FIG. 1 schematically shows the RTOO-14163 transmission 1 in which one of the splitter gears sets 2 is disposed behind the range section 3, with the range section between the splitter section and the main box section 4, in a manner such that the transmission requires two compound main shafts 5, 6 connected together with a small pin (not shown) that runs through the center of both shafts. When the transmission is in the fastest overdrive ratio (the rear sliding clutch 7 is shifted to the right in FIG. 1 and the range synchronization clutch 8 is shifted to the left), there is a rotating relative speed difference between these two compound main shafts 5, 6 that are butted up against one another. This could lead to a friction weld and seizing of these two shafts 5, 6 together. If this were to occur the compound main shaft would be in two gears at the same time and a counter shaft could fail. This design requires operators to avoid range shifting with the splitter in overdrive. If a range shift is made with the splitter in overdrive, nothing happens because the two compound main shafts are disconnected. When one then shifts the splitter to a direct drive configuration, there would be too much of a ratio step for the unsynchronized clutch to engage and noisy ratcheting is likely to occur.

Because of the two compound main shaft design, it is necessary to synchronize the main shaft through the main box section 4 with the main shaft through the range section 3, and the main shaft through the range section with the main shaft through the splitter section 2. In addition to the potential problems noted above, the need for synchronization between the double compound main shafts complicates desirable practices such as progressive shifting because the splitter change must synchronize the entire compound section rotating inertia plus the front main box shaft inertia. Further, the design of this transmission limits it to 13 gears.

It is generally desirable to have a variety of overdrive options associated with an engine to improve fuel economy. It is also desirable to facilitate progressive shifting by minimizing the need for synchronization. It is also desirable to reduce torque downstream to the axle carriers. It is further desirable to reduce drive shaft torque allowing for the use of standard drive shafts and higher reduction axle carriers.

According to an aspect of the present invention, An overdrive transmission, comprising a main box section connectable to an input shaft, an auxiliary section connected to the main box section and connectable to an output shaft, the auxiliary section further comprising a splitter section, and a range section. The transmission is adapted to be configured in a plurality of gear combinations, at least three of the gear combinations are configured for overdrive, and the main box section is connected directly to the splitter section.

According to another aspect of the present invention, a method of making an overdrive transmission comprises connecting a main box to an input shaft, connecting an auxiliary section to the main box section, the auxiliary section comprising a splitter section and a range section, and connecting the auxiliary section an output shaft. The transmission is adapted to be configured in a plurality of gear combinations, at least three of the gear combinations are configured for overdrive, and the main box section is connected directly to the splitter section.

BRIEF DESCRIPTION OF THE DRAWINGS

FIG. 4A is a table listing gears shown in FIGS. 2-3W and assigning them an illustrative number of teeth, and FIG. 4B is a table showing gear sets formed by the gears listed in FIG. 4A, and the gear ratios resulting from those gear sets according to an aspect of the present invention.

DETAILED DESCRIPTION

Figure 1:
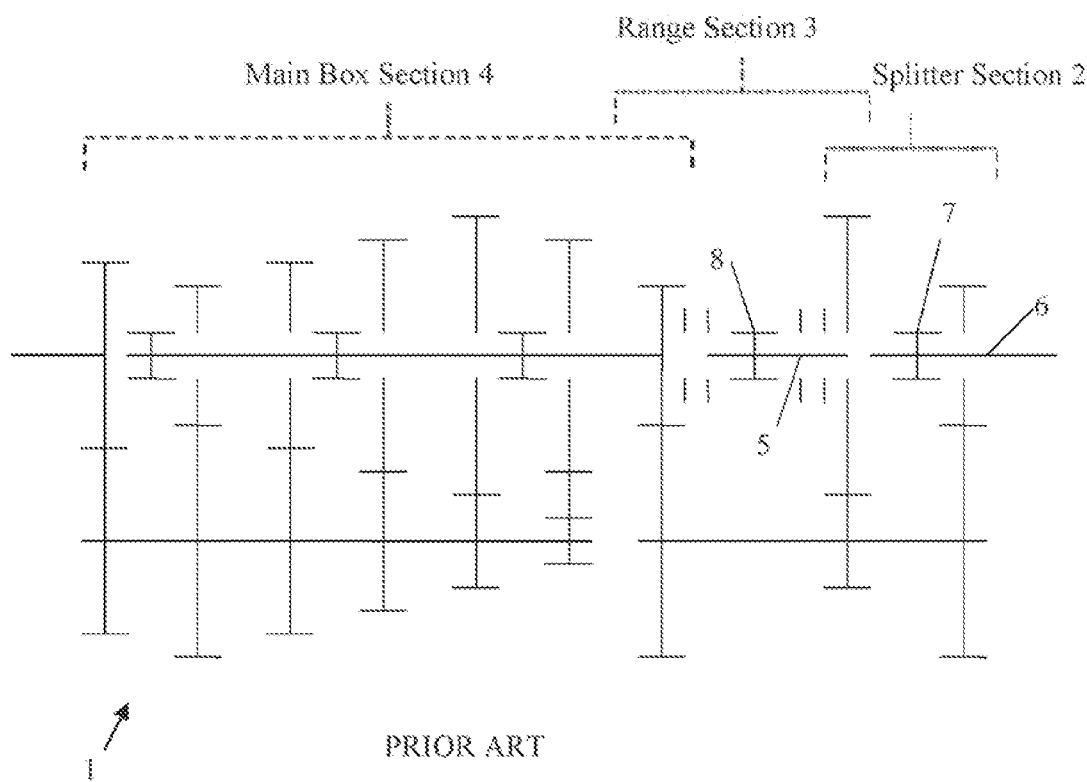
FIG. 1 schematically shows a prior art heavy truck transmission.
Figure 2:
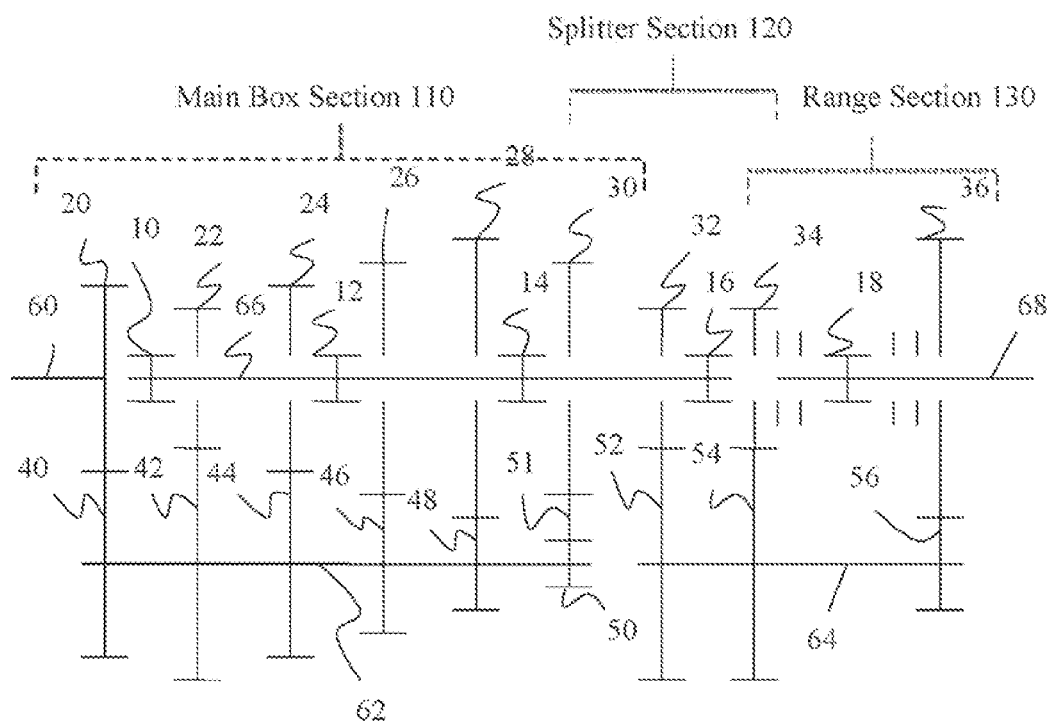
FIG. 2 schematically shows a heavy truck transmission as an aspect of the present invention.

A transmission for a heavy truck according to an aspect of the present invention is presented in FIG. 2. Power initially flows through the input shaft 60 and ultimately exits the output shaft 68. The path of the power flow depends on the position of the selectively configurable clutches 10, 12, 14, 16, and 18, allowing the transmission to engage different sets of gears. As shown in FIG. 4B, the gear combinations cause the output gear ratio to perform a variety of under drive and overdrive configurations.

The words "rightward," "leftward," "upper," and "lower" are not to be limiting, but are used for convenience to designate directions in the drawings to which references is made.

In an aspect of the invention shown in FIG. 2, the transmission 100 comprises a main portion 110 and an auxiliary portion further comprising a splitter portion 120 and range portion 130. The main portion 110 comprises a plurality of selectable gears capable of forming forward gears which may comprise an input gear 20, a plurality main shaft gears 22, 24, 26, and 28, and a plurality of countershaft gears 40, 42, 44, 46, and 48. The main portion 110 also comprises a main shaft gear 30 and a countershaft gear 50 adapted to be coupled by an idler gear 51 for providing reverse gears. The main box section comprises clutch collars 10, 12, and 14 which are connected to the main shaft 66 and axially movable by an operator to selectively couple one of input gear 20 or main shaft gear 22, 24, 26, 28, and 30 to the main shaft 66 via countershaft gears 40, 42, 44, 46, 48, and 50 fixed on a countershaft 62.

The auxiliary section comprises a splitter section 120 and a range section 130. In FIG. 2, the range section 130 is located after the splitter section 120. The auxiliary section, as illustrated, may only require the splitter to be synchronized with the front main box shaft inertia. The reverse configuration may require both the range and splitter to be synchronized when the splitter is used. As a result, the illustrated aspect of the invention may assist in progressive shifting.

Progressive shifting involves shifting upward as early as possible when accelerating so that after each shift is completed, the engine and transmission will operate at the lowest RPMs. When done properly, progressive shifting often results in quicker acceleration because diesel engines produce the most torque in lower RPM ranges. This technique may also reduce wear on the transmission due to the reduced synchronization. This implementation is also desirable to reduce torque downstream to the axle carriers. It is further desirable to reduce drive shaft torque allowing for the use of standard drive shafts and higher reduction axle carriers.

The auxiliary section comprises a plurality of selectable gears 32, 34, 36, 52, 54, and 56 providing different ratios between the main shaft 66 and the output shaft 68. The auxiliary section comprises auxiliary clutches 16 and 18 which are axially movable by an operator to selectively couple one of the main shaft gears 32, 34, and 36 in combination with the respective auxiliary countershaft gear 32, 34, and 36. Typically, auxiliary clutches 16 and 18 are axially positioned in a selected axial position by means of shift forks positioned by a remotely controlled fluid actuated piston assembly, but other methods may be used.

The range clutch 18 is moved between the leftward high range position and the rightward low range position. The high range position engages gears 34 and 54 while the low range position engages gears 36 and 56. The splitter clutch 16 is moved between the leftward and rightward positions for making splitter shifts. The leftward position engages gears 32 and 52 while the rightward position engages gears 34 and 54. Viewed in combination, the splitter and range clutches each have a shared gear set, gears 34 and 36. Each clutch also has a unique gear set, gears 32 and 52 for the splitter and gears 36 and 56 for the range.

FIG. 4A is a table in which each of the gears 20-56 has a particular number of teeth according to an illustrative embodiment of an aspect of the present invention. FIG. 48 is a table that shows how various gear ratios are achieved by various gear sets formed by the gears 20-56 having the number of teeth of the gears listed in FIG. 4A.

The splitter has at least one gear set, illustrated as 32 and 52, arranged to have an overdrive ratio. Similarly, a main box gear set, illustrated as 22 and 42, is arranged to have an overdrive ratio.

The combination of the splitter and main box gear sets may allow for at least three overdrive gears. Particularly, with the gears and gear sets described in FIGS. 4A and 4B, when there is a direct drive from the input to the main shaft and the splitter overdrive gear is engaged, a ratio of 0.83 may be obtained. Second, when the input shaft is connected to the main shaft through the main shaft overdrive gear set and the main gear shaft and the splitter section are in direct drive, a ratio of 0.71 may be obtained. Third, when the input shaft is connected to the main shaft through the man shaft overdrive gear and the main shaft and splitter overdrive gear is engaged, a ratio of 0.59 may be obtained.

In an aspect of the present invention, and as shown in FIG. 4A, main box 110 input gear 20 and main shaft gears 22, 24, 26, 25 and 30 may have 33, 27, 39, 45, 48 and 42 teeth, respectively. Main box 110 countershaft gears 40, 42, 44, 46, 48, and 50 may have 47, 54, 40, 33, 23 and 17 teeth, respectively. Auxiliary section main shaft gears 32, 34, and 36 may have 33, 30, and 54 teeth, respectively. Auxiliary section countershaft gears 52, 54, and 56 may have 45, 49 and 23 teeth, respectively. Idler gear 51 may have 24 teeth.

Figure 3A:
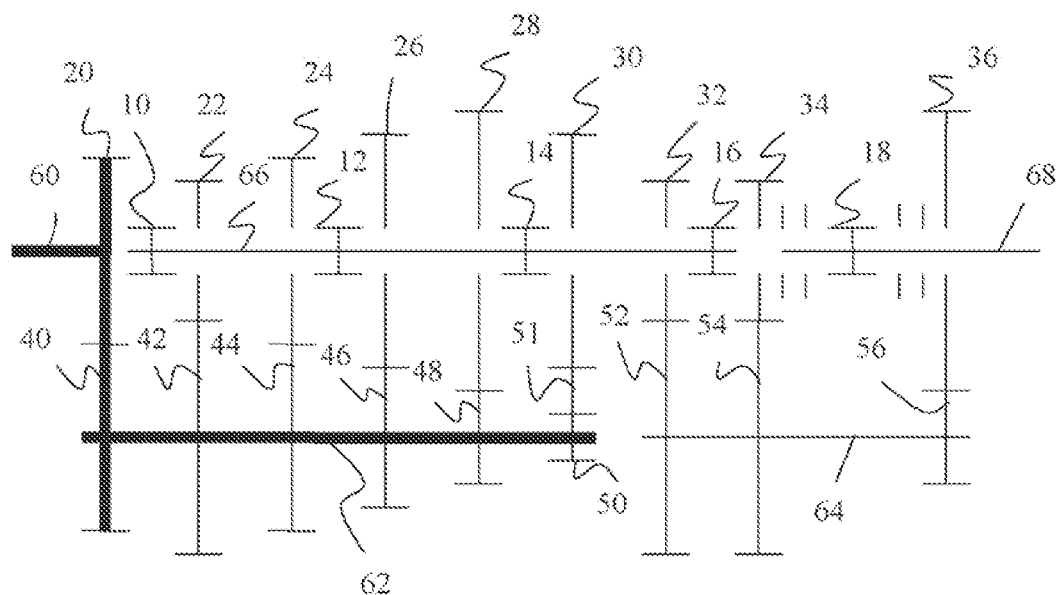
FIGS. 3A-3W each schematically show an arrangement of a heavy truck transmission according to an aspect of the present invention, including eighteen forward gears, four reverse gears and a neutral gear.

FIG. 3A schematically shows an embodiment of the transmission 100 configured in the neutral gear. None of the main box or auxiliary clutches is in a position to engage a gear set. Therefore, power does not flow to output shaft 68.

Figure 3B:
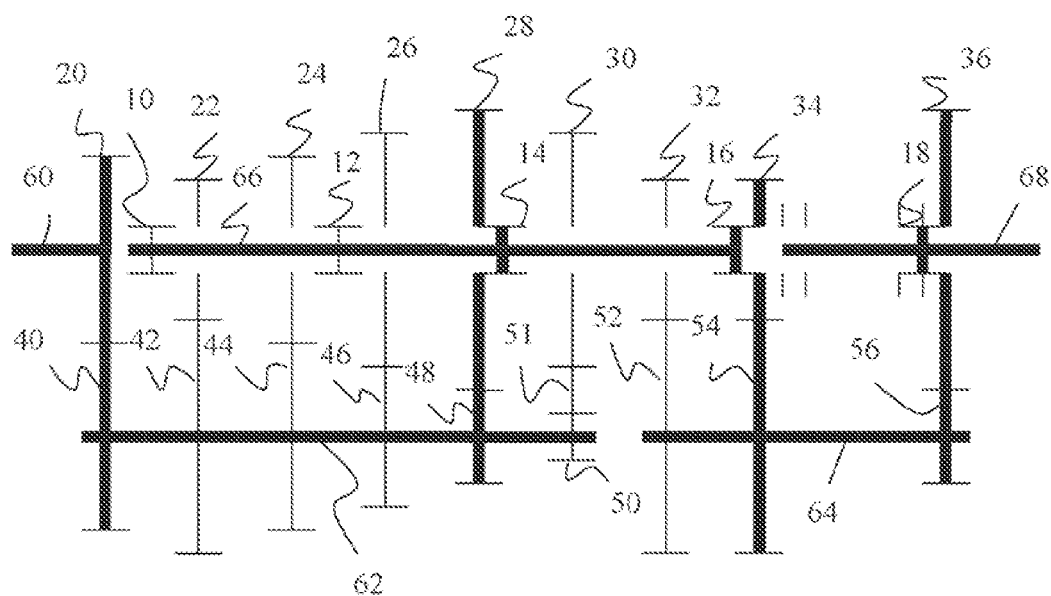

FIG. 3B schematically shows an embodiment of the transmission 100 configured in what is referred to here as the LOLO gear. The main box clutch 14 is in a leftward position allowing power to flow from the input shaft 60 to main box gear set 20 and 40, to the countershaft 62, to the main box gear set 28 and 38 to the splitter section 120. The splitter clutch 16 is in a rightward position engaging gear set 34 and 54. Power flows to the auxiliary countershaft assembly 64 into the range section 130. The range clutch e is in a rightward position engaging gear set 36 and 56. Power flows through the range gear set to the output shaft 68. Where gears 20, 40, 28, 48, 34, 54, 36 and 56 have 33, 47, 48, 23, 30, 49, 54 and 23 teeth, respectively, the result is a gear ratio of 11.40.

Figure 3C:
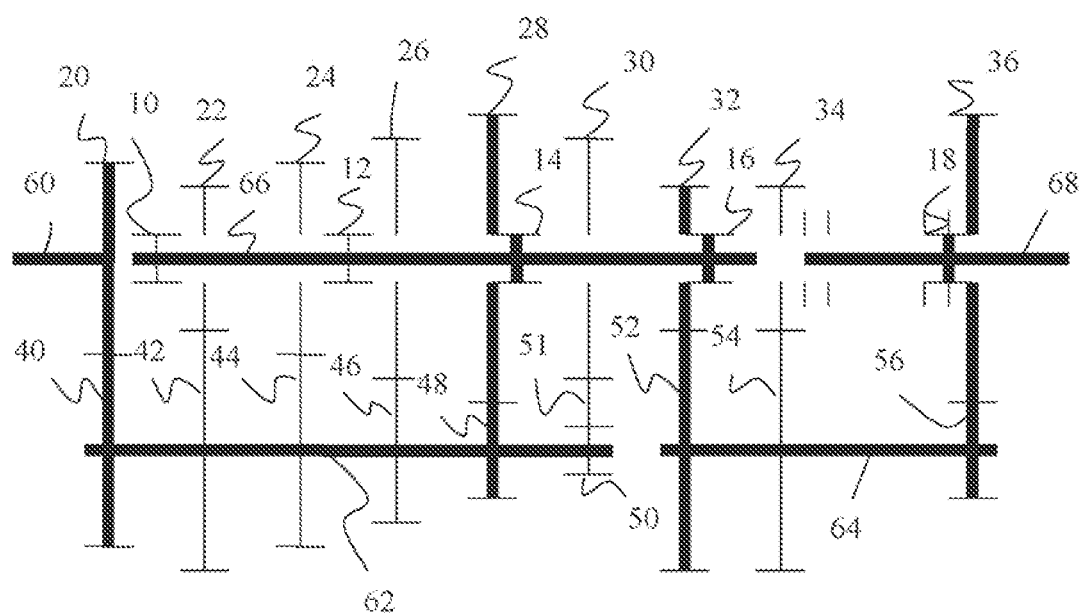

FIG. 3C schematically shows an embodiment of the transmission 100 configured in what is referred to here as the LO gear. The main box clutch 14 is in a leftward position allowing power to flow from the input shaft 60 to main box gear set 20 and 40, to the countershaft 62, to the main box gear set 28 and 48 to the splitter section 120. The splitter clutch 16 is in a leftward position engaging gear set 32 and 52. Power flows to the auxiliary countershaft assembly 64 into the range section 130. The range clutch 18 is in a rightward position engaging gear set 36 and 56. Power flows through the range gear set to the output shaft 68. Where gears 20, 40, 28, 48, 32, 52, 36 and 56 have 33, 47, 48, 23, 33, 45, 54 and 23 teeth, respectively, result is a gear ratio of 9.52.

Figure 3D:
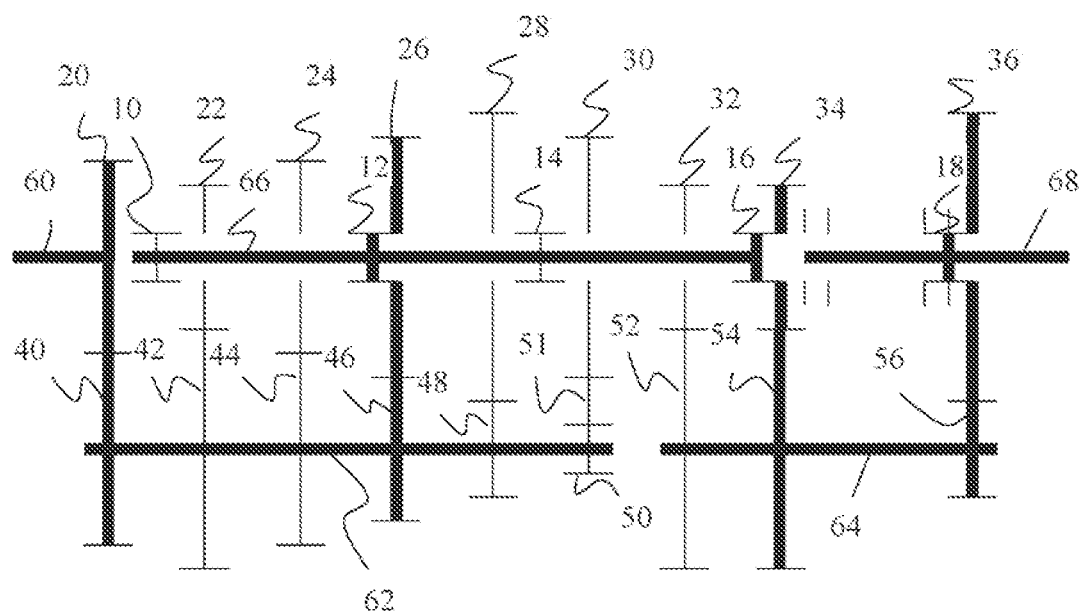

FIG. 3D schematically shows an embodiment of the transmission 100 configured in what is referred to here as the 1 HI gear. The main box clutch 12 is in a rightward position allowing power to flow from the input shaft 60 to main box gear set 20 and 40, to the countershaft 62, to the main box gear set 26 and 46 to the splitter section 120. The splitter clutch 16 is in a rightward position engaging gear set 34 and 54. Power flows to the auxiliary countershaft assembly 64 into the range section 130. The range clutch 18 is in a rightward position engaging gear set 36 and 56. Power flows through the range gear set to the output shaft 68. Where gears 20, 40, 26, 46, 34, 54, 36 and 56 have 33, 47, 45, 33, 30, 49, 54 and 23 teeth, respectively, the result is a gear ratio of 7.45.

Figure 3E:
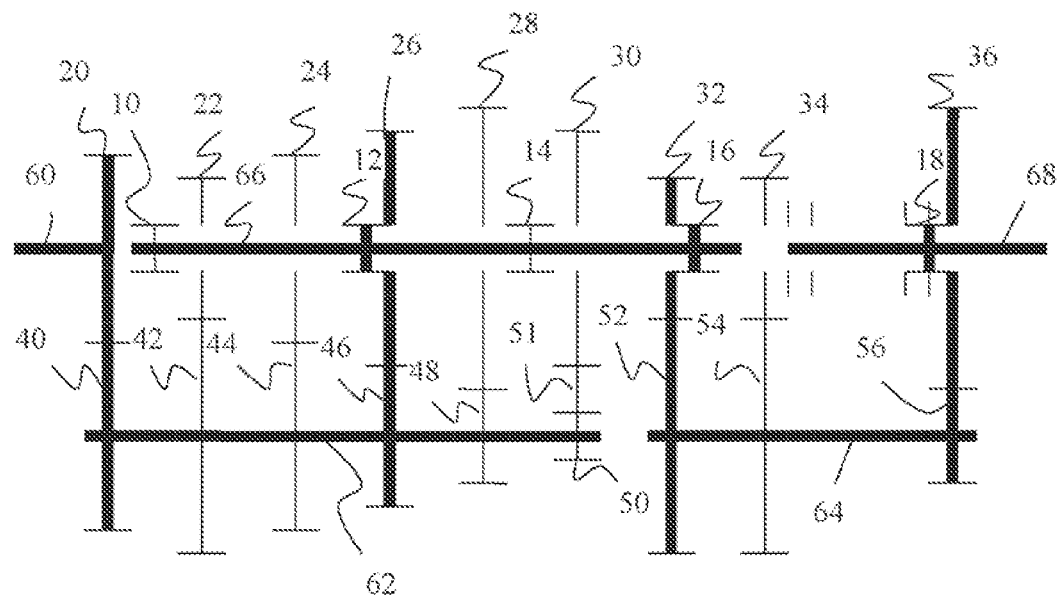

FIG. 3E schematically shows an embodiment of the transmission 100 configured in what is referred to here as the 1 LO gear. The main box clutch 12 is in a rightward position allowing power to flow from the input shaft 60 to main box gear set 20 and 40, to the countershaft 62, to the main box gear set 26 and 46 to the splitter section 120. The splitter clutch 16 is in a leftward position engaging gear set 32 and 52. Power flows to the auxiliary countershaft assembly 64 into the range section 130. The range clutch 18 is in a rightward position engaging gear set 36 and 56. Power flows through the range gear set to the output shaft 68. Where gears 20, 40, 26, 46, 32, 52, 36 and 56 have 33, 47, 45, 33, 33, 45, 54 and 23 teeth, respectively, result is a gear ratio of 6.22.

Figure 3F:
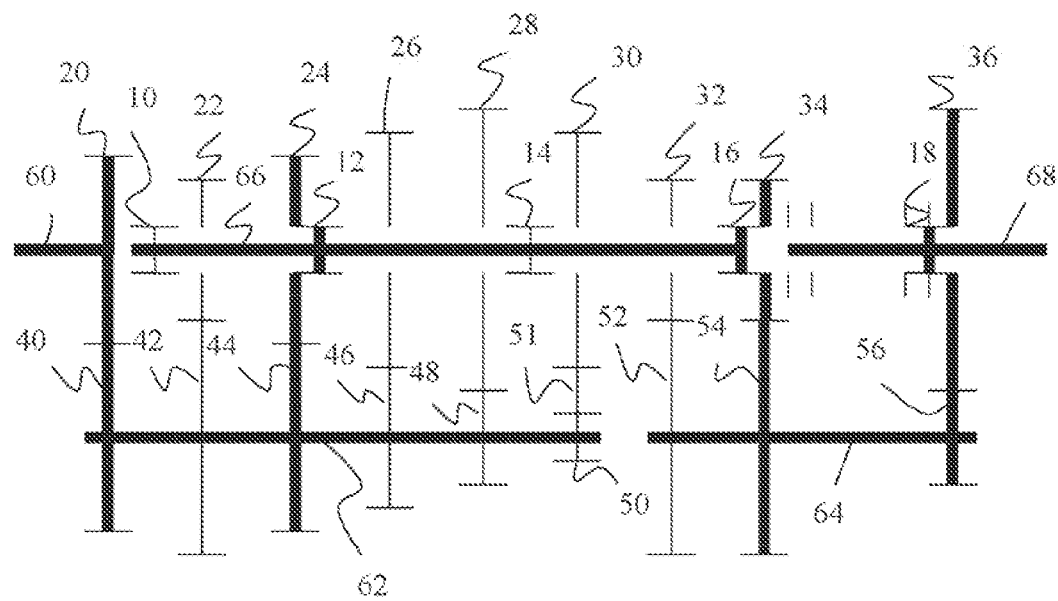

FIG. 3F schematically shows an embodiment of the transmission 100 configured in what is referred to here as the 2 HI gear. The main box clutch 12 is in a leftward position allowing power to flow from the input shaft 60 to main box gear set 20 and 40, to the countershaft 62, to the main box gear set 24 and 44 to the splitter section 120. The splitter clutch 16 is in a rightward position engaging gear set 34 and 54. Power flows to the auxiliary countershaft assembly 64 into the range section 130. The range clutch 18 is in a rightward position engaging gear set 36 and 56. Power flows through the range gear set to the output shaft 68. Where gears 20, 40, 24, 44, 34, 54, 36 and 56 have 33, 47, 39, 40, 30, 49, 54 and 23 teeth, respectively, the result is a gear ratio of 5.33

Figure 3G:
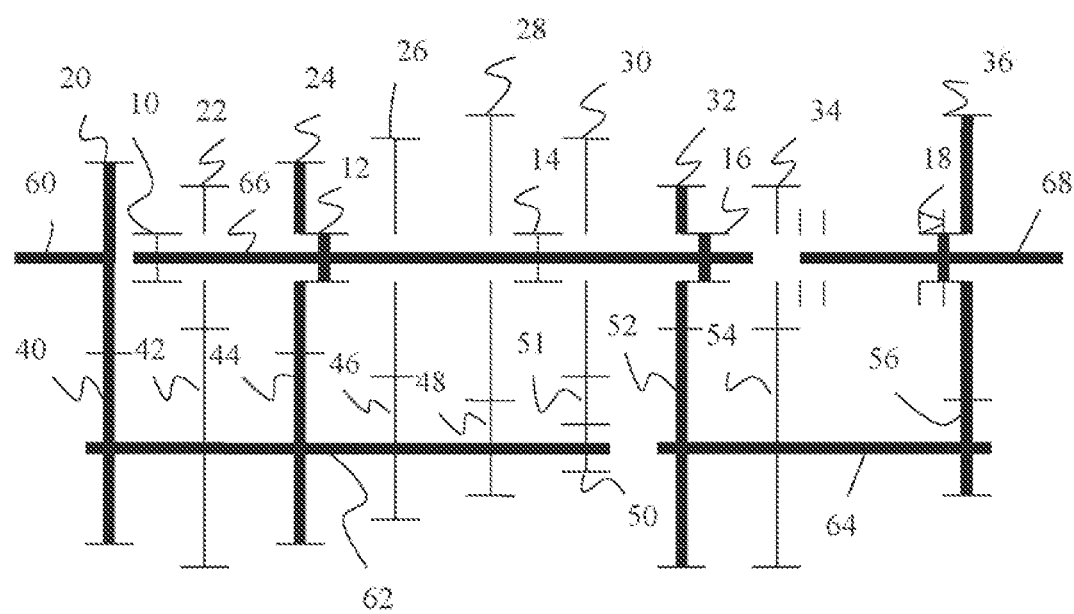

FIG. 3G schematically shows an embodiment of the transmission 100 configured in what is referred to here as the 2 LO gear. The main box clutch 12 is in a leftward position allowing power to flow from the input shaft 60 to main box gear set 20 and 40, to the countershaft 62, to the main box gear set 24 and 44 to the splitter section 120. The splitter clutch 16 is in a leftward position engaging gear set 32 and 52. Power flows to the auxiliary countershaft assembly 64 into the range section 130. The range clutch 18 is in a rightward position engaging gear set 36 and 56. Power flows through the range gear set to the output shaft 65. Where gears 20, 40, 24, 44, 32, 52, 36 and 56 have 33, 47, 39, 40, 33, 45, 54 and 23 teeth, respectively, the result is a gear ratio of 4.45.

Figure 3H:
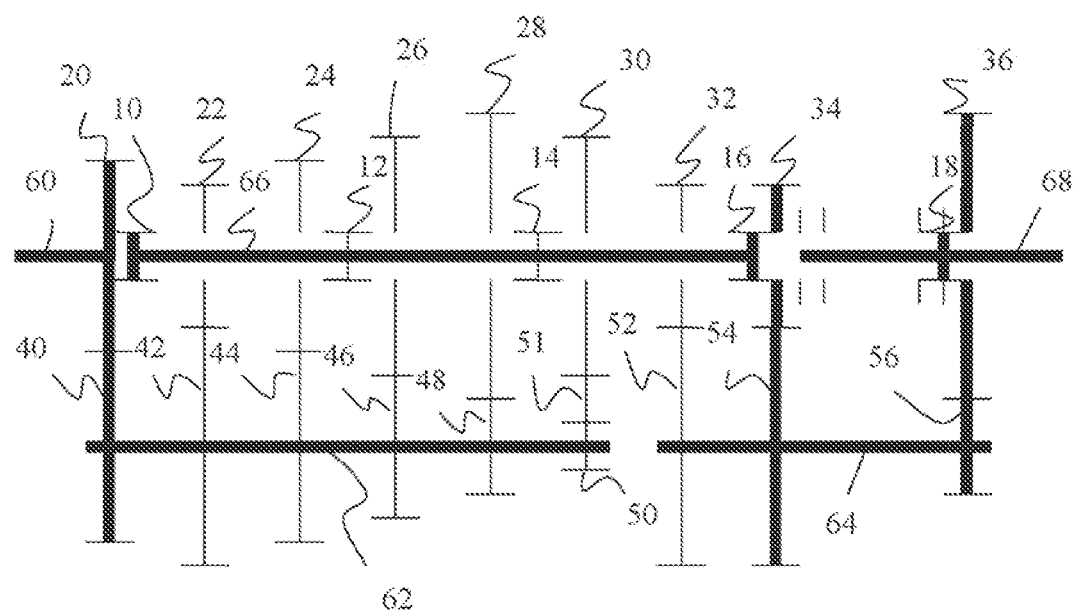

FIG. 3H schematically shows an embodiment of the transmission 100 configured in what is referred to here as the 3 HI gear. The main box clutch 10 is in a leftward position allowing power to flow directly from the input shaft 60 to main shaft, to the splitter section 120. The splitter clutch 16 is in a rightward position engaging gear set 34 and 54. Power flows to the auxiliary countershaft assembly 64 into the range section 130. The range clutch 18 is in a rightward position engaging gear set 36 and 56. Power flows through the range gear set to the output shaft 68. Where gears 34, 54, 36 and 56 have 30, 49, 54 and 23 teeth, respectively, the result is a gear ratio of 3.82.

Figure 3I:
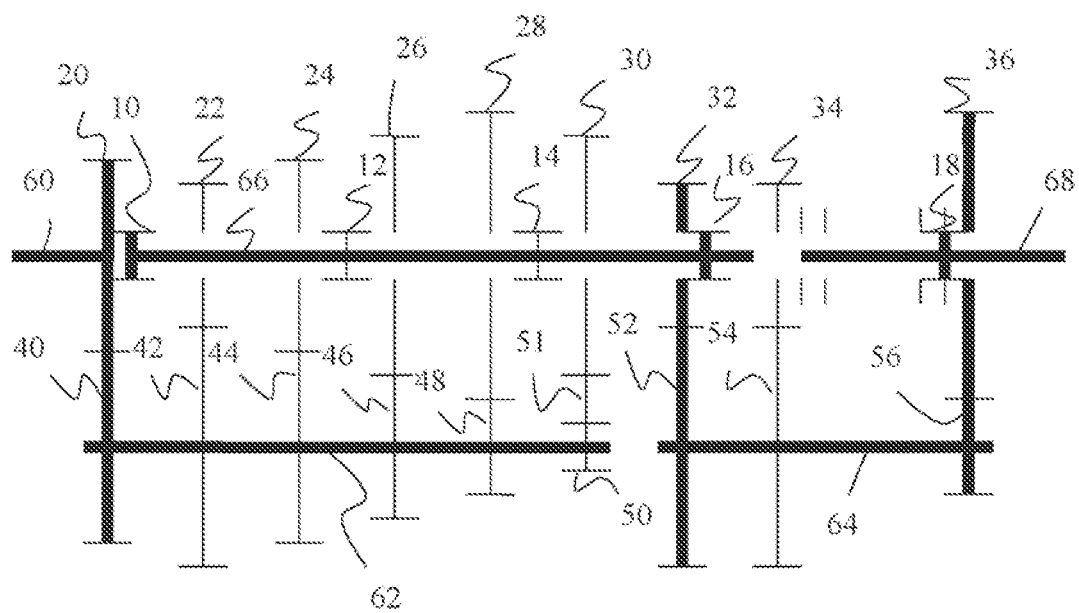

FIG. 3I schematically shows an embodiment of the transmission 100 configured in what is referred to here as the 3 LO gear. The main box clutch 10 is in a leftward position allowing power to flow directly from the input shaft 60 to main shaft, to the splitter section 120. The splitter clutch 16 is in a leftward position engaging gear set 32 and 52. Power flows to the auxiliary countershaft assembly 64 into the range section 130. The range clutch 18 is in a rightward position engaging gear set 36 and 56. Power flows through the range gear set to the output shaft 68. Where gears 32, 52, 36 and 56 have 33, 45, 54 and 23 teeth, respectively, the result is a gear ratio of 3.2.

Figure 3J:
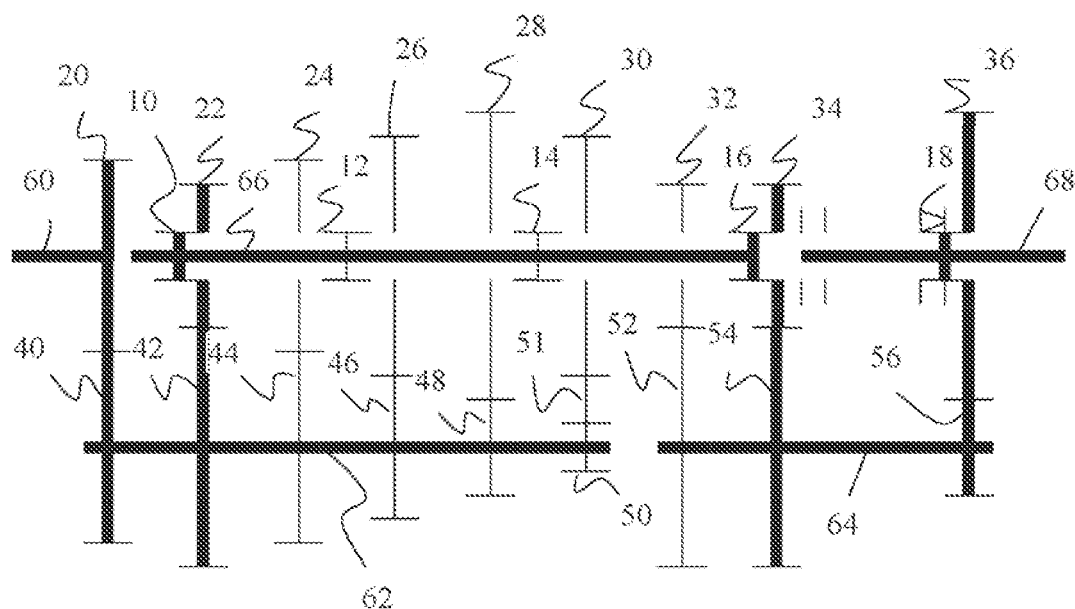

FIG. 3J schematically shows an embodiment of the transmission 100 configured in what is referred to here as the 4 HI gear. The main box clutch 10 is in a rightward position allowing power to flow from the input shall 60 to main box gear set 20 and 40, to the countershaft 62, to the main box gear set 22 and 42 to the splitter section 120. The splitter clutch 16 is in a rightward position engaging gear set 34 and 54. Power flows to the auxiliary countershaft assembly 64 into the range section 130. The range clutch 18 is in a rightward position engaging gear set 36 and 56. Power flows through the range gear set to the output shaft 68. Where gears 20, 40, 22, 42, 34, 54, 36 and 56 have 33, 47, 27, 54, 30, 49, 54 and 23 teeth, respectively, the result is a gear ratio of 2.73.

Figure 3K:
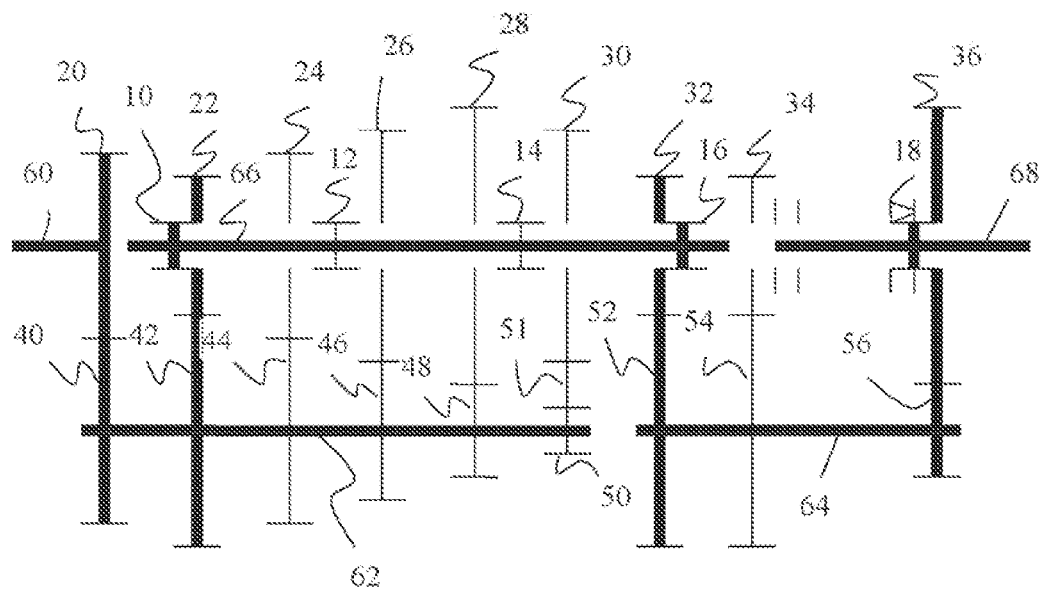

FIG. 3K schematically shows an embodiment of the transmission 100 configured in what is referred to here as the 4 LO gear. The main box clutch 10 is in a rightward position allowing power to flow from the input shaft 60 to main box gear set 20 and 40, to the countershaft 62, to the main box gear set 22 and 42 to the splitter section 120. The splitter clutch 16 is in a leftward position engaging gear set 32 and 52. Power flows to the auxiliary countershaft assembly 64 into the range section 130. The range clutch 18 is in a rightward position engaging gear set 36 and 56. Power flows through the range gear set to the output shaft 68. Where gears 20, 40, 22, 42, 32, 52, 36 and 56 have 33, 47, 47, 54, 33, 45, 54 and 23 teeth, respectively, the result is a gear ratio of 2.28.

Figure 3L:
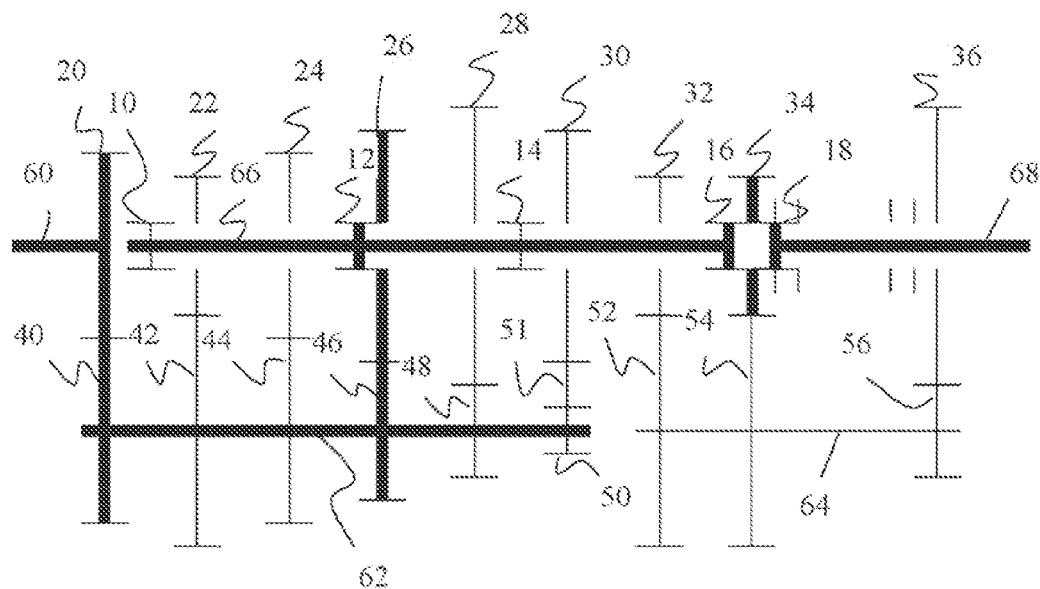

FIG. 3L schematically shows an embodiment of the transmission 100 configured in what is referred to here as the 5 HI gear. The main box clutch 12 is in a rightward position allowing power to flow from the input shaft 60 to main box gear set 20 and 40, to the countershaft 62, to the main box gear set 26 and 46 to the splitter section 120. The splitter clutch 16 is in a rightward position and the range clutch 18 is in a leftward position, allowing power to flow directly to the output shaft 68 via gear set 34 and 54. Where gears 20, 40, 26, and 46 have 33, 47, 45 and 33 teeth, respectively, the result is a gear ratio of 1.94.

Figure 3M:
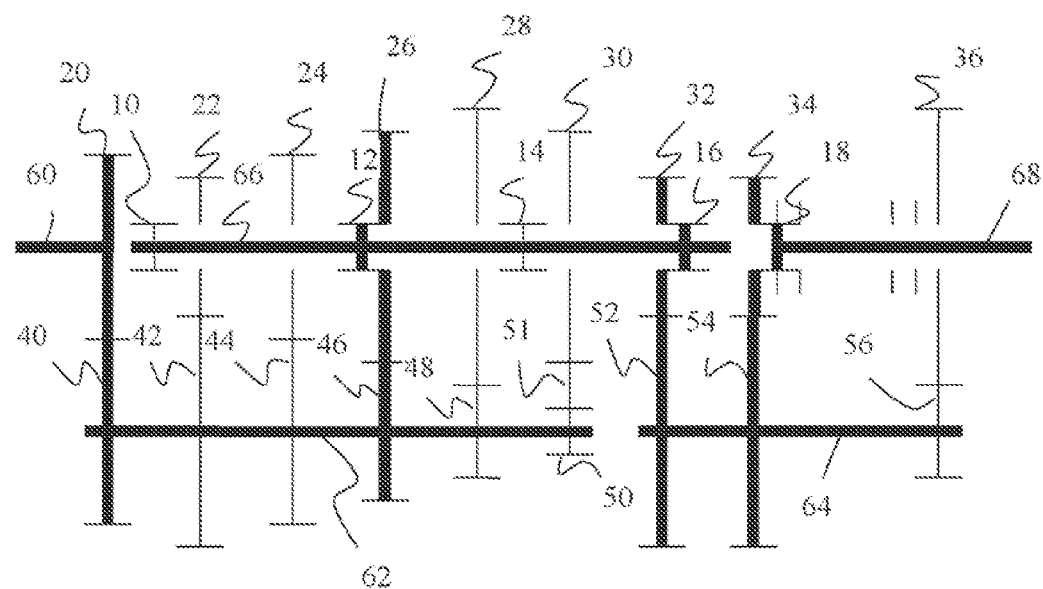

FIG. 3M schematically shows an embodiment of the transmission 100 configured in what is referred to here as the 5 LO gear. The main box clutch 12 is in a rightward position allowing power to flow from the input shaft 60 to main box gear set 20 and 40, to the countershaft 62, to the main box gear set 26 and 46 to the splitter section 120. The splitter clutch 16 is in a leftward position engaging gear set 32 and 52. Power flows to the auxiliary countershaft assembly 64 into the range section 130. The range clutch 18 is in a leftward position engaging gear set 34 and 54. Power flows through the range gear set to the output shaft 68. Where gears 20, 40, 26, 46, 32, 52, 34 and 54 have 33, 47, 45, 33, 33, 45, 30 and 49 teeth, respectively, the result is a gear ratio of 1.62.

Figure 3N:
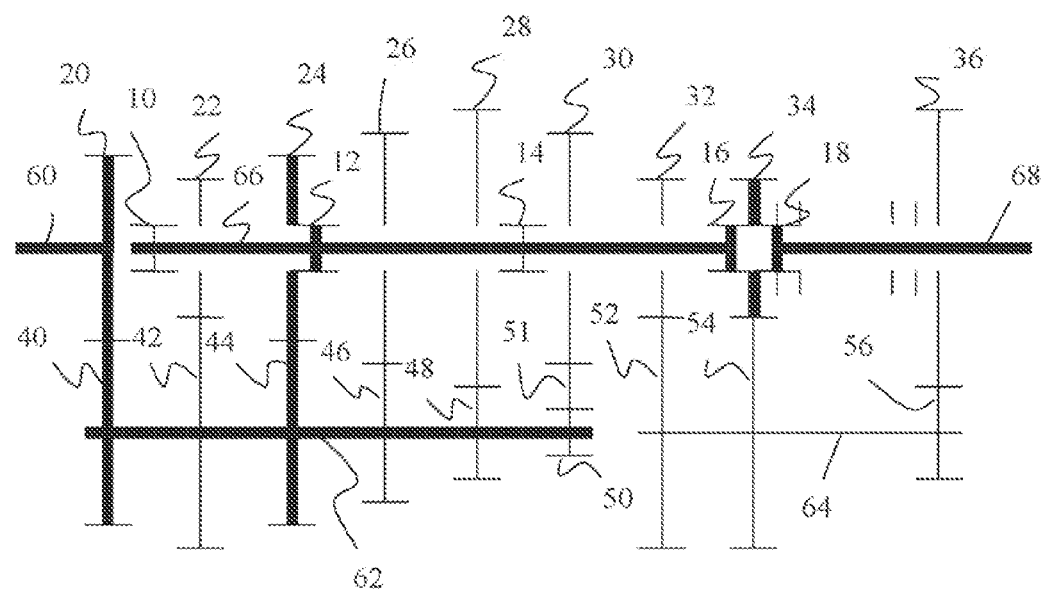

FIG. 3N schematically shows an embodiment of the transmission 100 configured in what is referred to here as the 6 HI gear. The main box clutch 12 is in a leftward position allowing power to flow from the input shaft 60 to main box gear set 20 and 40, to the countershaft 62, to the main box gear set 24 and 44 to the splitter section 120. The splitter clutch 16 is in a rightward position and the range clutch 18 is in a leftward position, allowing power to flow directly to the output shaft 68 via gear set 34 and 54. Where gears 20, 40, 24, and 44 have 33, 47, 39 and 40 teeth, respectively, the result is a gear ratio of 1.39.

Figure 3O:
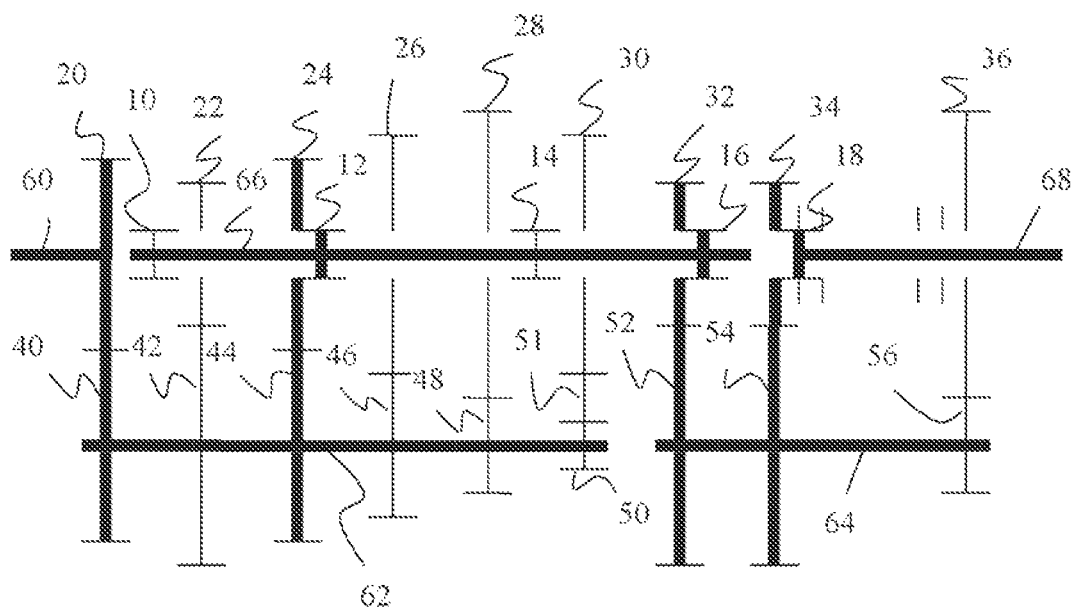

FIG. 3O schematically shows an embodiment of the transmission 100 configured in what is referred to here as the 6 LO gear. The main box clutch 12 is in a leftward position allowing power to flow from the input shaft 60 to main box gear set 20 and 40, to the countershaft 62, to the main box gear set 24 and 44 to the splitter section 120. The splitter clutch 16 is in a leftward position engaging gear set 32 and 52. Power flows to the auxiliary countershaft assembly 64 into the range section 130. The range clutch 18 is in a leftward position engaging gear set 34 and 54. Power flows through the range gear set to the output shaft 68. Where gears 20, 40, 24, 44, 32, 52, 34 and 54 have 33, 47, 39, 40, 33, 45, 30 and 49 teeth, respectively, the result is a gear ratio of 1.16.

Figure 3P:
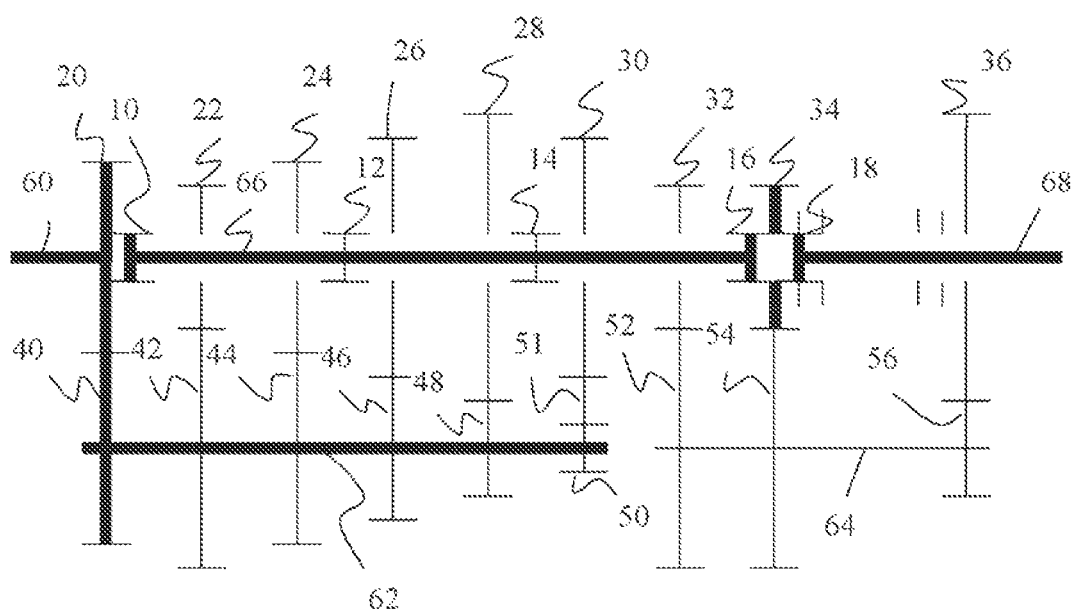
Figure 3O:
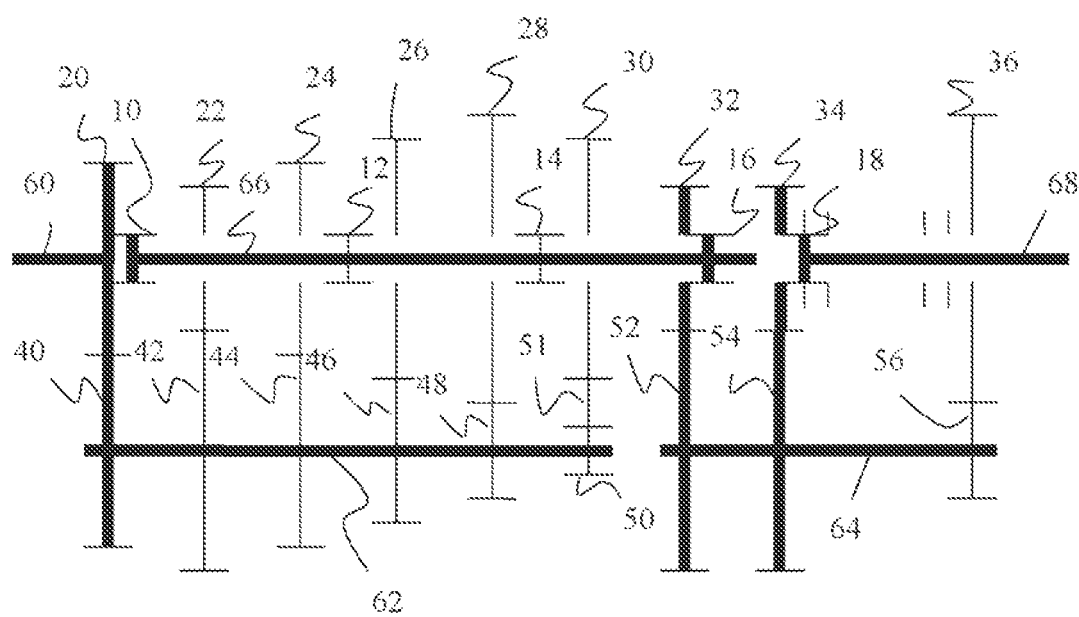

FIG. 3P schematically shows an embodiment of the transmission 100 configured in what is referred to here as the 7 HI gear. The main box clutch 10 is in a leftward position allowing power to flow directly from the input shaft 60 to main shaft, to the splitter section 120. The splitter clutch 16 is in a rightward position and the range clutch 18 is in a leftward position, allowing power to flow directly to the output shaft 68 via gear set 34 and 54. Since no gear sets are engaged, the result is a gear ratio of 1.00.

FIG. 3Q schematically shows an embodiment of the transmission 100 configured in what is referred to here as the 7 LO gear. The main box clutch 10 is in a leftward position allowing power to flow directly from the input shaft 60 to main shaft, to the splitter section 120. The splitter clutch 16 is in a leftward position engaging gear set 32 and 52. Power flows to the auxiliary countershaft assembly 64 into the range section 130. The range clutch 18 is in a leftward position engaging gear set 34 and 54. Power flows through the range gear set to the output shaft 68. Where gears 32, 52, 34 and 54 have 33, 45, 30 and 49 teeth, respectively, the result is an overdrive gear ratio of 0.83.

Figure 3R:
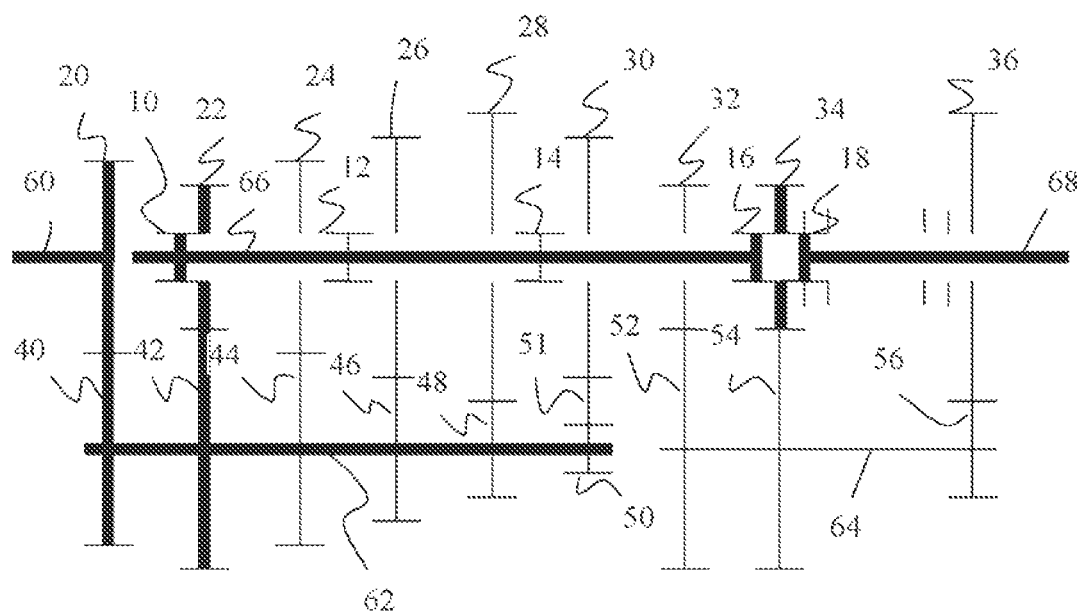

FIG. 3R schematically shows an embodiment of the transmission 100 configured in what is referred to here as the 8 HI gear. The main box clutch 10 is in a rightward position allowing power to flow from the input shaft 60 to main box gear set 20 and 40, to the countershaft 62, to the main box gear set 22 and 42 to the splitter section 120. The splitter clutch 16 is in a rightward position and the range clutch 18 is in a leftward position, allowing power to flow directly to the output shaft 68 via gear set 34 and 54. Where gears 20, 40, 22 and 44 have 33, 47, 27, and 54 teeth, respectively, the result is an overdrive gear ratio of 0.71.

Figure 3S:
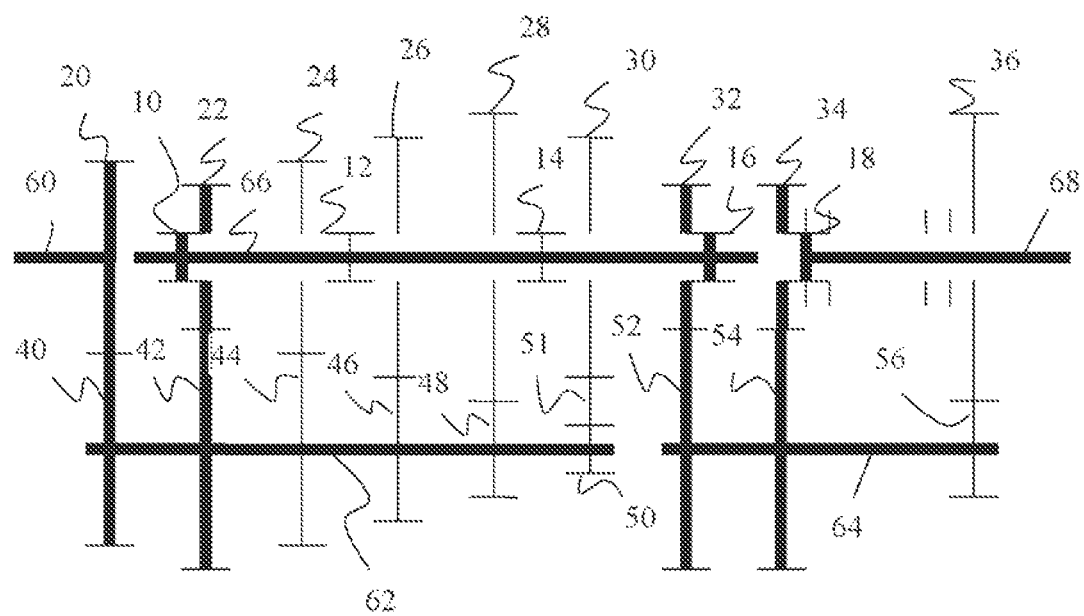

FIG. 3S schematically shows an embodiment of the transmission 100 configured in what is referred to here as the 8 LO gear. The main box clutch 10 is in a rightward position allowing power to flow from the input shaft 60 to main box gear set 20 and 40, to the countershaft 62, to the main box gear set 22 and 42 to the splitter section 120. The splitter clutch 16 is in a leftward position engaging gear set 32 and 52. Power flows to the auxiliary countershaft assembly 64 into the range section 130. The range clutch 18 is in a leftward position engaging gear set 34 and 54. Power flows through the range gear set to the output shaft 68. Where gears 20, 40, 22, 42, 32, 52, 34 and 54 have 33, 47, 27, 54, 33, 45, 30 and 49 teeth, respectively, the result is an overdrive gear ratio of 0.59.

Figure 3T:
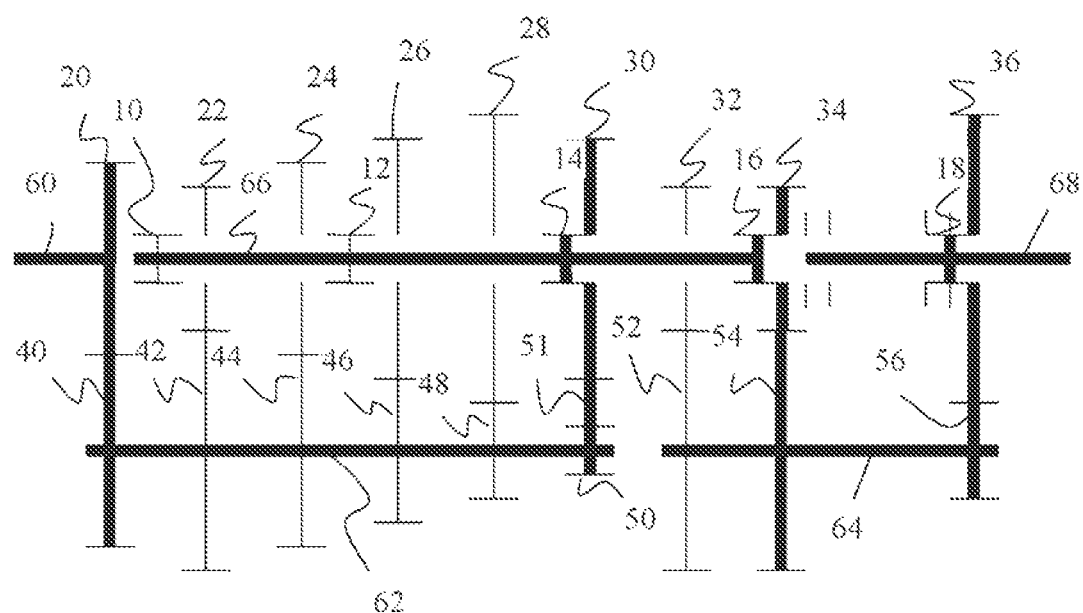

FIG. 3T schematically shows an embodiment of the transmission 100 configured in what is referred to here as the REV1 HI gear. The main box clutch 14 is in a rightward position allowing power to flow from the input shaft 60 to main box gear set 20 and 40, to the countershaft 62, to the main box gear set 30 and 50 to the sputter section 120. The splitter clutch 16 is in a rightward position engaging gear set 34 and 54. Power flows to the auxiliary countershaft assembly 64 into the range section 130. The range clutch 18 is in a rightward position engaging gear set 36 and 56. Power flows through the range gear set to the output shaft 68. Where gears 20, 40, 30, 50, 34, 54, 36, 56 and 51 have 33, 47, 42, 17, 30, 49, 54, 23 and 24 teeth, respectively, the result is a reverse gear ratio of 13.49.

Figure 3U:
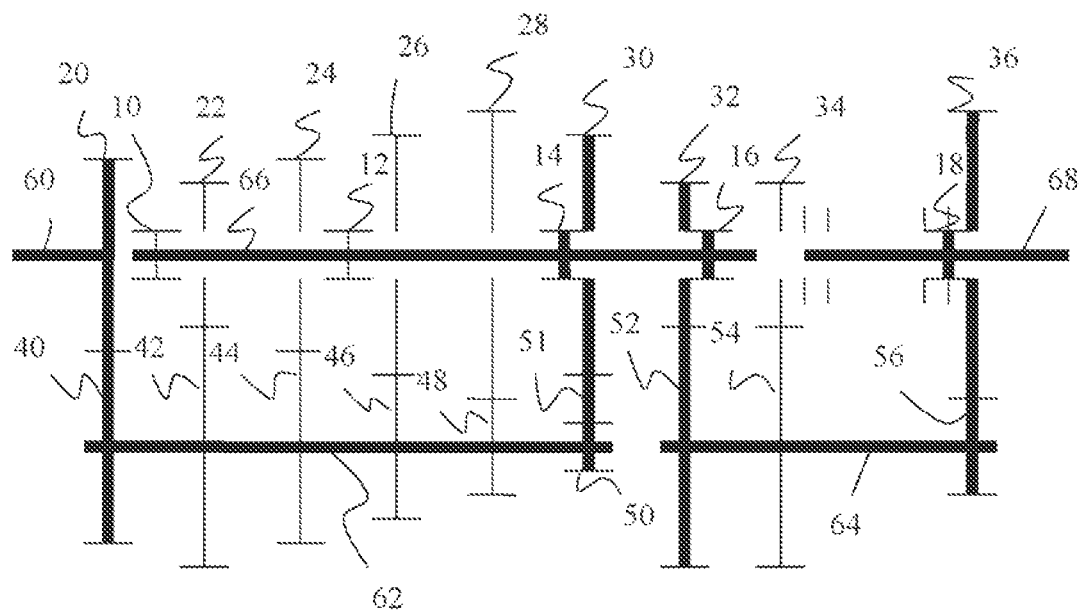

FIG. 3U schematically shows an embodiment of the transmission 100 configured in what is referred to here as the REV1 LO gear. The main box clutch 14 is in a rightward position allowing power to flow from the input shaft 60 to main box gear set 20 and 40, to the countershaft 62, to the main box gear set 30 and 50 to the splitter section 120. The splitter clutch 16 is in a leftward position engaging gear set 32 and 52. Power flows to the auxiliary countershaft assembly 64 into the range section 130. The range clutch 18 is in a rightward position engaging gear set 36 and 56. Power flows through the range gear set to the output shaft 68. Where gears 20, 40, 30, 50, 32, 52, 36, 56 and 51 have 33, 47, 42, 17, 33, 45, 54, 23 and 24 teeth, respectively, the result is a reverse gear ratio of 11.27.

Figure 3V:
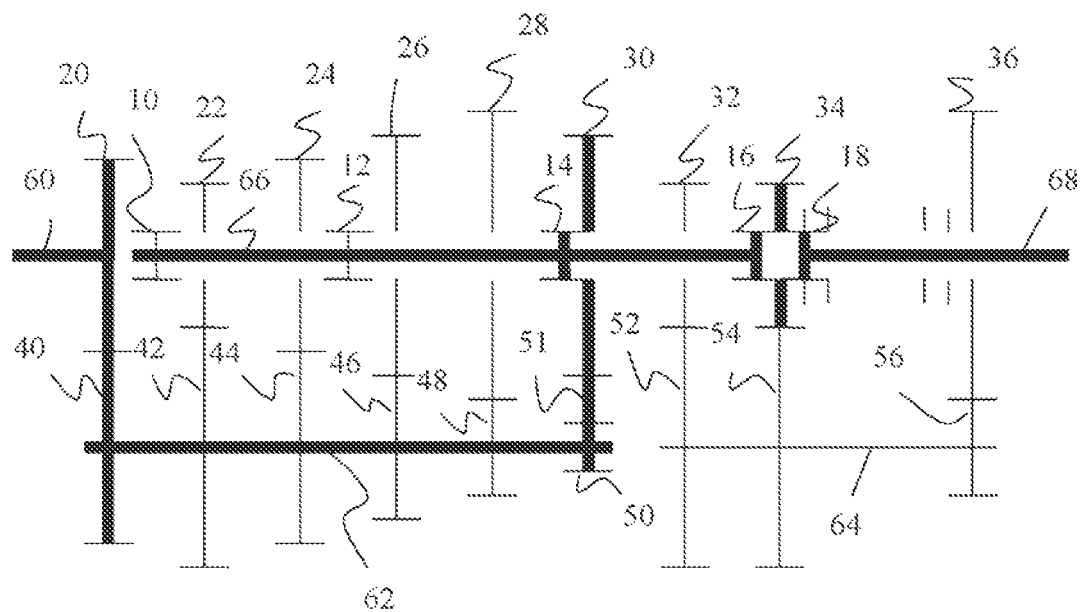

FIG. 3V schematically shows an embodiment of the transmission 100 configured in what is referred to here as the REV2 HI gear. The main box clutch 14 is in a rightward position allowing power to flow from the input shaft 60 to main box gear set 20 and 40, to the countershaft 62, to the main box gear set 30 and 50 to the splitter section 120. The splitter clutch 16 is in a rightward position and the range clutch 18 is in a leftward position, allowing power to flow directly to the output shaft 68 via gear set 34 and 54. Where gears 20, 40, 30, 50, and 51 have 33, 47, 42, 17, and 24 teeth, respectively, the result is a reverse gear ratio of 3.52.

Figure 3W:
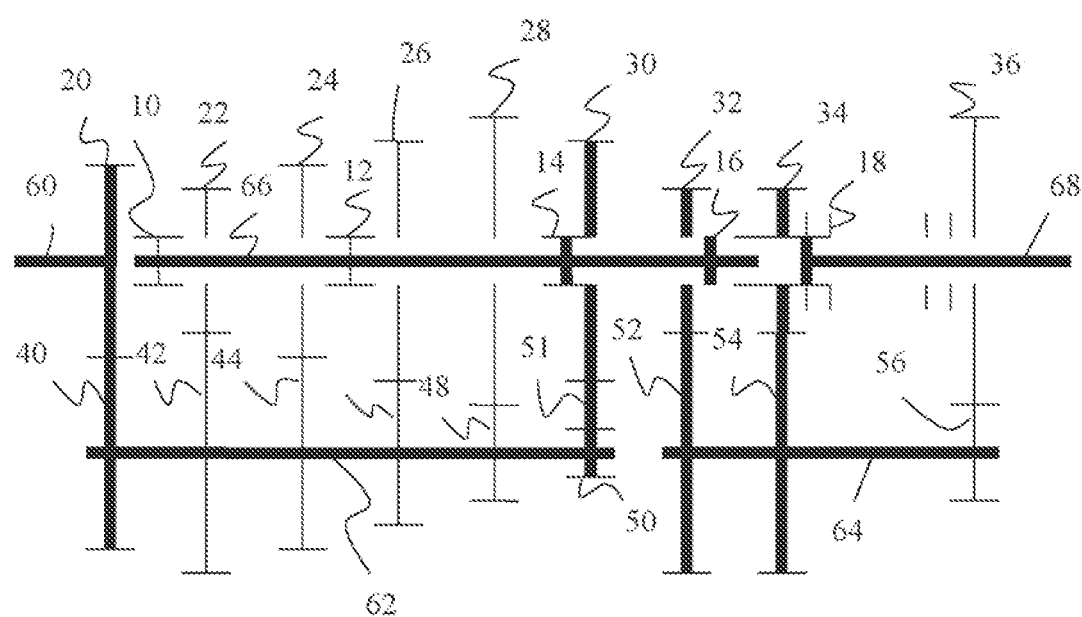

FIG. 3W schematically shows an embodiment of the transmission 100 configured in what is referred to here as the REV2 LO gear. The main box clutch 14 is in a rightward position allowing power to flow from the input shaft 60 to main box gear set 20 and 40, to the countershaft 62, to the main box gear set 30 and 50 to the splitter section 120. The splitter clutch 16 is in a leftward position engaging gear set 32 and 52. Power flows to the auxiliary countershaft assembly 64 into the range section 130. The range clutch 18 is in a leftward position engaging gear set 34 and 54. Power flows through the range gear set to the output shaft 68. Where gears 20, 40, 30, 50, 32, 32, 34, 54 and 51 have 33, 47, 42, 17, 33, 45, 30, 49 and 24 teeth, respectively, the result is a reverse gear ratio of 2.94.

In the transmission shown in FIGS. 2-3W, there are three overdrive combinations shown in this triple overdrive configuration: the 7 LO gear is shown in FIG. 3Q, the 8 HI gear is shown in FIG. 3R, and the 8 LO gear is shown in FIG. 3S.

A transmission with a gear capable of an overdrive gear ratio in the main box is capable of creating a double overdrive feature. When the splitter also has a gear with an overdrive ratio, as shown in the illustrated embodiment, the combination is capable of a triple overdrive condition that can be useful in maintaining low engine speed under certain driving conditions. The triple overdrive capability may be a better fit for newly designed lower speed, fuel-efficient engines. This better gear fit to the engine will improve fuel economy.

In addition, a transmission according to an aspect of the present invention can reduce the torque downstream in the axle carriers which facilitates the use of high numerical ratio carriers, and carriers that have lower torque carrying capability. The transmission can reduce the need for a high torque drive shaft and axle carrier input, although a drives shaft suited for use at higher speeds may be desirable. Further, torque multiplication can increase in the axle carrier while carried torque will be reduced in the drive shaft and carrier input shaft.

Further, by providing only a single compound main shaft (i.e., shafts 66 and 68), the need for synchronization between shafts is minimized, which can facilitate desirable activities such as progressive shifting. Particularly, because both of the splitter gear sets are located on the front side of the range gearing and clutched to the front transmission main box shaft, progressive shifting is facilitated because the splitter change only needs to synchronize the front main box shaft inertia. In the illustrated design, eighteen gears can be provided.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An overdrive transmission, comprising:
   a main box section connectable to an input shaft;
   an auxiliary section connected to the main box section and connectable to an output shaft, the auxiliary section further comprising:
      a splitter section, and
      a range section;
   the transmission having a plurality of gear combinations, at least three of the gear combinations being configured to provide three different overdrive ratios, and the main box section being connected directly to the splitter section.

2. The overdrive transmission of claim 1, wherein the main box section includes a gear set with an overdrive ratio.

3. The overdrive transmission of claim 1, wherein the splitter section includes a gear set with an overdrive ratio.

4. The overdrive transmission of claim 1, wherein the auxiliary section comprises a splitter clutch and a range clutch, each with a unique gear set and a shared gear set.

5. The overdrive transmission of claim 1, wherein, in one of the at least three overdrive gear combinations, the main box section is in an overdrive configuration, the splitter section is in a direct drive configuration between the main box section and the range section, and the range section is in a direct drive configuration between the splitter section and the output shaft.

6. The overdrive transmission of claim 1, wherein, in two of the overdrive gear combinations, an overdrive gear set on the splitter section is engaged and, in two of the overdrive gear combinations, an overdrive gear set on the main box section is engaged.

7. The overdrive transmission of claim 1, wherein exactly three of the gear combinations are configured for overdrive.

8. The overdrive transmission of claim 1, wherein, in one of the at least three overdrive gear combinations, the main box is in a direct configuration between the input shaft and the splitter section, the splitter section is in an overdrive configuration, and the range section is in a direct configuration between the splitter section and the output shaft.

9. The overdrive transmission of claim 1, wherein, in one of the at least three overdrive gear combinations, the main box section is in an overdrive configuration, the splitter section is in an overdrive configuration, and the range section is in a direct drive configuration between the splitter section and the output shaft.

10. A method of making, an overdrive transmission comprising the steps of:
    connecting a main box to an input shaft;
    connecting an auxiliary section to the main box section, the auxiliary section comprising a splitter section and a range section;
    connecting the auxiliary section to an output shaft;
    the transmission having a plurality of gear combinations, at least three of the gear combinations being configured to provide three different overdrive ratios, and the main box section being connected directly to the splitter section.

11. The method of claim 10, wherein the splitter section includes a gear set with an overdrive ratio.

12. The method of claim 10, wherein the auxiliary section comprises a splitter clutch and a range clutch, each with a unique gear set and a shared gear set.

13. The method of claim 10, wherein main box section includes an overdrive gear set.

14. The method of claim 10, wherein in one of the at least three overdrive gear combinations, the main box section is in an overdrive configuration, the splitter section is in an overdrive configuration, and the range section is in a direct drive configuration between the splitter section and the output shaft.

15. The method of claim 10, wherein, in one of the at least three overdrive gear combinations, the main box section is in an overdrive configuration, the splitter section is in a direct drive configuration between the main box section and the range section and the range section is in a direct drive configuration between the splitter section and the output shaft.

16. The method of claim 10, wherein, in one of the at least three overdrive gear combinations, the main box section is in a direct configuration, the splitter section is in an overdrive configuration, and the range section is in a direct drive configuration between the splitter section and the output shaft.

* * * * *